Patented Mar. 5, 1946

2,396,067

UNITED STATES PATENT OFFICE 2,396,067

PREPARATION OF 2-AMINOPYRAZINE

Philip S. Winnek, Indianapolis, Ind., and Quintin P. Cole, Greenwich, Conn., assignors to American Cyanamid Company, New York, N. Y., a corporation of Maine No Drawing. Application August 25, 1943, Serial No. 499,994

4 Claims. (Cl. 260—250)

This invention relates to a method for preparing 2-aminopyrazine. More particularly, it relates to a method for preparing 2-aminopyrazine by a method employing 2-chloropyrazine or 2-bromopyrazine as an intermediate.

The preparation of the new compound, 2-chloropyrazine, is not claimed in this application but is claimed in a copending application (see application Serial No. 499,993, filed August 25, 1943). In general, the methods utilized for producing 2-chloropyrazine comprise subjecting pyrazine, in the vapor phase, to chlorination.

In the past, methods for the production of 2-aminopyrazine involved lengthy processes which are not well suited for commercial use. One of the earliest processes described for the production of 2-aminopyrazine is that of Gabriel and Sonn (Ber. 40, 4851–4860, 1907), wherein pyrazine 2,3-dicarboxylic acid was used as the starting material. The principal objections to this method are the relatively large number of steps, the low yields, and the relatively impure products. Hall and Spoerri (J. A. C. S., 62, 664–65, 1940) describe a method which is a modification of the Gabriel and Sonn method. The Hall and Spoerri method comprises the steps of heating pyrazine 2,3-dicarboxylic acid to give 2-carboxylic acid which is converted to the methyl ester and then reacted with ammonia to give 2-aminopyrazine. While the 2-aminopyrazine produced by the method of Hall and Spoerri is satisfactory as far as purity is concerned, the number of steps required makes the process undesirable for the commercial production of 2-aminopyrazine at a reasonable cost.

2-aminopyrazine is an important intermediate in the preparation of 2-sulfanilamidopyrazine, a promising chemotherapeutic agent. It is very desirable, therefore, that methods be developed for the production of 2-aminopyrazine on a commercial scale at a lower cost than heretofore possible. By the use of the present invention for the production of 2-aminopyrazine we have overcome the undesirable features of the prior process.

In carrying out the present invention we have found that 2-aminopyrazine can be produced from 2-chloro- or 2-bromopyrazine by treatment with anhydrous ammonia at an elevated temperature.

Preferably, the reaction is carried out in a suitable inert solvent or diluent. Among those that are especially suitable as solvents are the aliphatic alcohols, including methanol, ethanol, propanol, isopropanol, and the like. It should be understood, however, that any organic solvent, inert to the reactants under the conditions employed, can be used.

The temperature at which the reaction is carried out can be varied to a considerable extent, the most desirable range being of from about 150 to 200° C.

After the reaction is complete, the solvent and excess reactants are removed under reduced pressure. The 2-aminopyrazine is recrystallized from hot benzene. The 2-aminopyrazine obtained by carrying out this invention has a relatively high degree of purity.

The invention will be described in greater detail in connection with the following specific example, which is merely illustrative of the preferred method of preparing representative compounds and not intended to limit the scope of the invention. The parts are by weight except in the case of liquids which are expressed in corresponding parts by volume.

EXAMPLE

Preparation of 2-aminopyrazine

A mixture of 10 parts of 2-chloropyrazine, 25 parts of anhydrous ammonia, and 25 parts of absolute ethanol was heated with shaking in an autoclave at 175° C. for three hours. The solvent and excess reactants were removed at room temperature under diminished pressure, and the crystalline brown residue was taken up in 75 parts of hot benzene. The solution was filtered to remove some black resinous material and then cooled to 5° C. The yellow crystals of 2-aminopyrazine that separated were filtered off, washed with benzene, and dried. The yield of 2-aminopyrazine, which had a melting point of 110–115° C. was 57%.

In another experiment a small amount of 2-bromopyrazine was reacted with ammonia, employing conditions similar to those described in the above example. The product obtained was shown by test to be 2-aminopyrazine and had a melting point of 110 to 115° C.

In carrying out our process we prefer to utilize 2-chloropyrazine because at the present time it is somewhat cheaper and more readily available than 2-bromopyrazine.

As previously pointed out the reaction between the 2-halopyrazine and ammonia is preferably carried out within the temperature range of from 150 to 200° C. In many cases, however, it may be possible to carry the reaction out at temperatures ranging from about 100° C. up to the decomposition point of the product.

The above description and example are intended to be illustrative only. Any modification or variation therefrom which conforms to the spirit of the invention is intended to be included within the scope of the claims.

What we claim is:

1. The method for producing 2-aminopyrazine which comprises reacting anhydrous ammonia with a 2-halogenated pyrazine selected from the group consisting of 2-chloropyrazine and 2-bromopyrazine by heating said reactants at a temperature of at least 100° C. wherein the reaction is carried out in an inert anhydrous organic liquid.

2. The process for producing 2-aminopyrazine which comprises reacting anhydrous ammonia with 2-chloropyrazine by heating said reactants at a temperature of at least 100° C. wherein the reaction is carried out in anhydrous ethanol.

3. The process for producing 2-aminopyrazine which comprises reacting anhydrous ammonia with 2-bromopyrazine by heating said reactants at a temperature of at least 100° C. wherein the reaction is carried out in anhydrous ethanol.

4. The process for producing 2-aminopyrazine which comprises reacting anhydrous ammonia with 2-chloropyrazine in an anhydrous ethanol medium at a temperature of from 150–200° C.

PHILIP S. WINNEK.
QUINTIN P. COLE.